US009476322B2

(12) United States Patent
Charron et al.

(10) Patent No.: US 9,476,322 B2
(45) Date of Patent: Oct. 25, 2016

(54) COMBUSTOR TRANSITION DUCT ASSEMBLY WITH INNER LINER

(75) Inventors: Richard C. Charron, West Palm Beach, FL (US); Daniel J. Pierce, Waxhaw, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 1313 days.

(21) Appl. No.: 13/541,818

(22) Filed: Jul. 5, 2012

(65) Prior Publication Data

US 2014/0010644 A1 Jan. 9, 2014

(51) Int. Cl.
*F02C 3/00* (2006.01)
*F01D 25/26* (2006.01)
*F01D 9/02* (2006.01)

(52) U.S. Cl.
CPC ............... *F01D 25/26* (2013.01); *F01D 9/023* (2013.01); *F05D 2250/322* (2013.01); *F05D 2250/323* (2013.01); *F05D 2250/38* (2013.01); *F05D 2250/71* (2013.01)

(58) Field of Classification Search
CPC ................... F01D 9/023; F01D 25/26; F23D 2900/03041; F23D 2900/03042; F23D 3/06
USPC ........................ 60/39.37, 752, 754, 755, 757
See application file for complete search history.

(56) References Cited

U.S. PATENT DOCUMENTS 2,765,620 A 10/1956 Egbert
3,016,703 A * 1/1962 Morris et al. .................. 60/752
3,991,562 A 11/1976 Nelson et al.
4,009,569 A 3/1977 Kozlin
5,329,773 A 7/1994 Myers et al.
6,352,211 B1 3/2002 Bentley
7,082,770 B2 8/2006 Martling et al.
7,237,389 B2 7/2007 Ryan et al.
7,310,938 B2 * 12/2007 Marcum ................ F01D 9/023 60/39.37
7,340,881 B2 * 3/2008 Koganezawa .......... F01D 9/023 60/39.511
7,493,767 B2 2/2009 Bunker et al.
7,762,402 B2 7/2010 Hakola
8,402,764 B1 * 3/2013 Liang .............................. 60/755
8,667,682 B2 * 3/2014 Lee et al. .................. 29/890.01
2009/0084100 A1 4/2009 Johnson et al.
2009/0260340 A1 10/2009 Hessler et al.
2010/0037617 A1 2/2010 Charron et al.
2010/0037618 A1 2/2010 Charron et al.
2010/0037619 A1 2/2010 Charron
2010/0071382 A1 * 3/2010 Liang .............................. 60/806
2010/0180605 A1 * 7/2010 Charron .......................... 60/796
2010/0316492 A1 * 12/2010 Charron et al. ........... 415/182.1
2012/0121381 A1 * 5/2012 Charron ................. F01D 9/023 415/115
2012/0237786 A1 * 9/2012 Morrison et al. ............ 428/596

* cited by examiner

*Primary Examiner* — Charles Freay

(57) ABSTRACT

A transition duct assembly for a turbine engine includes a transition duct with an inner liner removably received therein. The duct is hollow with an inner peripheral surface and an outer peripheral surface. The duct can have an inlet end and an outlet end. The inner peripheral surface of the duct can be convergent along a majority of the length of the duct when moving from the inlet end to the outlet end thereof. The liner is hollow body with an inner peripheral surface and an outer peripheral surface. The outer peripheral surface of the liner can be correspondingly convergent to the inner peripheral surface of the duct. The inner peripheral surface of the liner can define an internal flow passage through the assembly. Such a construction permits the use of different materials for the liner and the duct and can allow the liner to be readily removed and replaced.

18 Claims, 9 Drawing Sheets

COMBUSTOR TRANSITION DUCT ASSEMBLY WITH INNER LINER

FIELD OF THE INVENTION

Aspects of the invention relate in general to turbine engines and, more particularly, to transition ducts in the combustor section of a turbine engine.

BACKGROUND OF THE INVENTION

FIG. 1 shows an example of a combustion turbine engine 10. The turbine engine 10 includes a compressor section 12, a combustor section 14, and a turbine section 16. The combustor section 14 can include a plurality of combustors 18 (only one of which is shown) arranged in an annular array around a rotor. The turbine section 16 includes alternating rows of stationary airfoils 20 and rotating airfoils 22.

In operation, air is drawn in through the compressor section 12, where it is compressed and driven towards the combustor section 14. The compressed air 24 can be distributed to the plurality of combustors 18. The air 24 can be mixed with fuel to form an air/fuel mixture. In each combustor 18, the fuel/air mixture can be ignited to form a working gas 25. A duct 26 (sometimes referred to as a transition) can be provided for each combustor 18 to receive the hot working gas 25 therefrom. The duct 26 can route the working gas 25 to the turbine section 16. The transition duct 26 has an inner peripheral surface 28 and an outer peripheral surface 30. The inner peripheral surface 28 of the transition duct 26 defines the flow path for the hot working gas flowing therethrough.

The transition ducts 26 are typically monolithic structures that are made of a single material. However, such a construction is not well suited for the various operational loads expected to be imposed on the transition duct 26. For instance, the inner peripheral surface 28 of the transition duct 26 is exposed to the highest temperatures of combustion and combustion dynamics and, as a result, is susceptible to damage therefrom. On the other hand, the outer peripheral surface 30 of the transition duct 26 is not directly exposed to the hot working gas path and therefore will be less directly impacted by the high combustion temperatures and combustion dynamics. However, the outer peripheral surface 30 is equipped with mounting and sealing structures and must be able to withstand the associated mounting and sealing loads imposed thereon.

Thus, the inner and outer peripheral surfaces 28, 30 of the transition duct 26 are subjected to different types and amounts of loading during engine operation. If the material of the transition duct 26 is selected based mostly on the expected loads imposed on the inner peripheral surface 26 thereof, the selected material may be less than optimal for the kinds of loads experienced at the outer peripheral surface 30. Thus, there is a need for a system that can minimize these concerns.

SUMMARY OF THE INVENTION

According to aspects of the invention, a transition duct assembly for a turbine engine has an inner peripheral surface that is convergent along a majority of the transition duct when moving from the inlet end to the outlet end thereof and includes an inner liner removably received within the transition duct that is correspondingly convergent to the inner peripheral surface of the transition duct and provides an internal flow passage through the assembly. The transition duct can be made of a different material than the inner liner.

The inlet end of the transition duct can include a flange and the inlet end of the inner liner can include a flange, and the flanges can engage. The inlet end of the transition duct can also include a recess to receive at least a portion of the flange of the inner liner to make the respective inlets flush.

The liner can include a plurality of holes through the peripheral surface. At least a portion of the inner peripheral surface of the inner liner can be coated with a thermal insulating material.

The transition duct can be substantially straight with a single piece inner liner. Alternatively, the transition duct can be curved in the outlet end region of the liner and the inner liner can be made of a plurality of segments including an upstream liner segment and a downstream liner segment. These two segments can abut or attached.

The inner liner can substantially matingly engage the inner peripheral surface of the transition duct, or the inner liner can be spaced from the inner peripheral surface of the transition duct. A plurality of protrusions can extend from the inner peripheral surface of the transition duct so that the protrusions maintain the inner liner in spaced relation to the transition duct.

A series of transition duct assemblies can be incorporated into a turbine system with each transition duct body located between a respective combustor and a first stage blade array to receive the gas flow exhausted by the respective combustor into the internal passage through the inlet in the inner liner, the outlet of the inner liner discharging the gas flow from the internal passage directly to the first stage blade array. The internal passage of each duct is free of vanes, whereby the gas flow discharged from the outlet of each transition duct body flows to the first stage blade array without passing any flow turning vanes.

DETAILED DESCRIPTION OF EMBODIMENTS OF THE INVENTION

Embodiments of the invention are directed to a transition duct assembly for a turbine engine. Aspects of the invention will be explained in connection with various possible configurations and systems for a transition duct assembly, but the detailed description is intended only as exemplary. Embodiments of the invention are shown in FIGS. 2-9, but embodiments of the invention are not limited to the illustrated structure or application.

Figure 1:
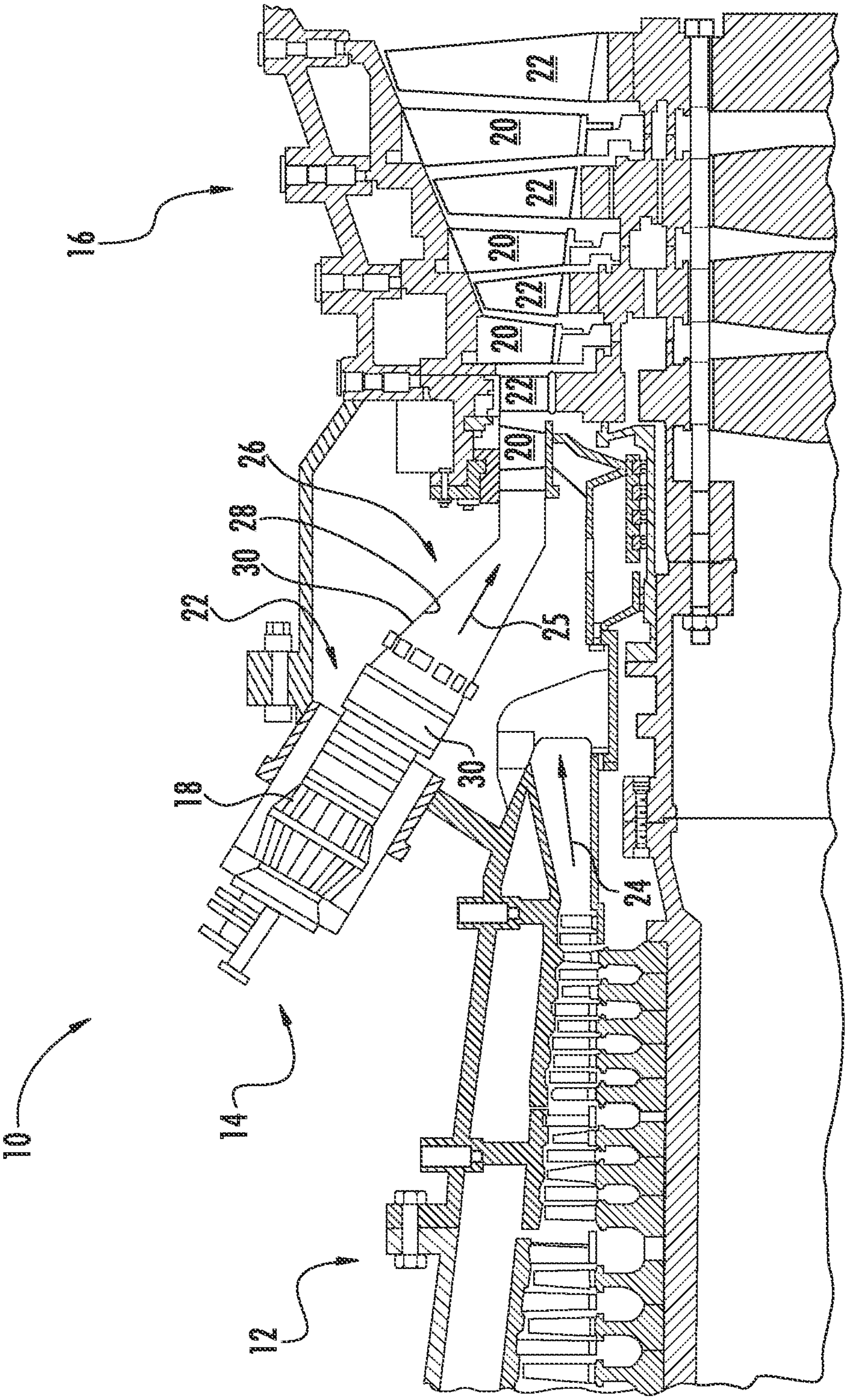
FIG. 1 (PRIOR ART)
FIG. 1 is a side elevation cross-sectional view through a portion of a known turbine engine.
Figure 2:
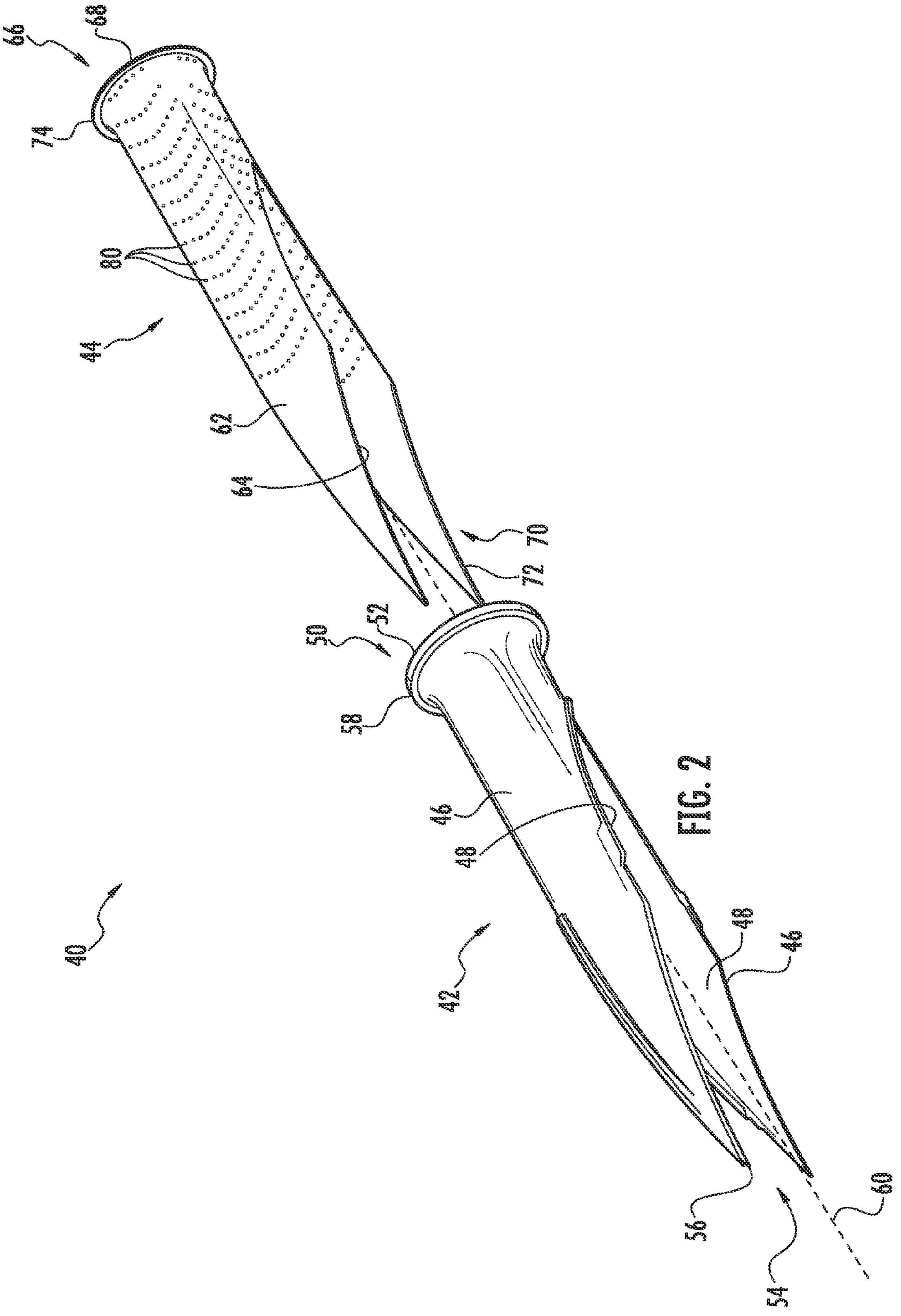
FIG. 2 is an exploded view of a transition duct assembly according to aspects of the invention.

Referring to FIG. 2, a transition duct assembly 40 according to aspects of the invention is shown. The assembly 40 includes a transition duct 42 and an inner liner 44. The assembly 40 according to aspects of the invention can be used in connection with various transition duct systems. Embodiments of the invention are particularly suited for systems in which the transition duct 42 is configured so that the first stage stationary airfoils (vanes) in the turbine section is eliminated and so that the hot working gases exiting the transition duct 42 are presented directly to a row of rotating airfoils (blades) with high tangential velocity. In such cases, the transition duct 26 accomplishes the task of redirecting the gases, which would otherwise have been accomplished by a first row of turbine vanes. Examples of transition ducts systems having such a configuration are described in U.S. Patent Application Publication Nos. 2010/0037617, 2010/0037618, 2010/0037619 and 2010/0180605, which are incorporated herein by reference in their entirety.

Figure 8:
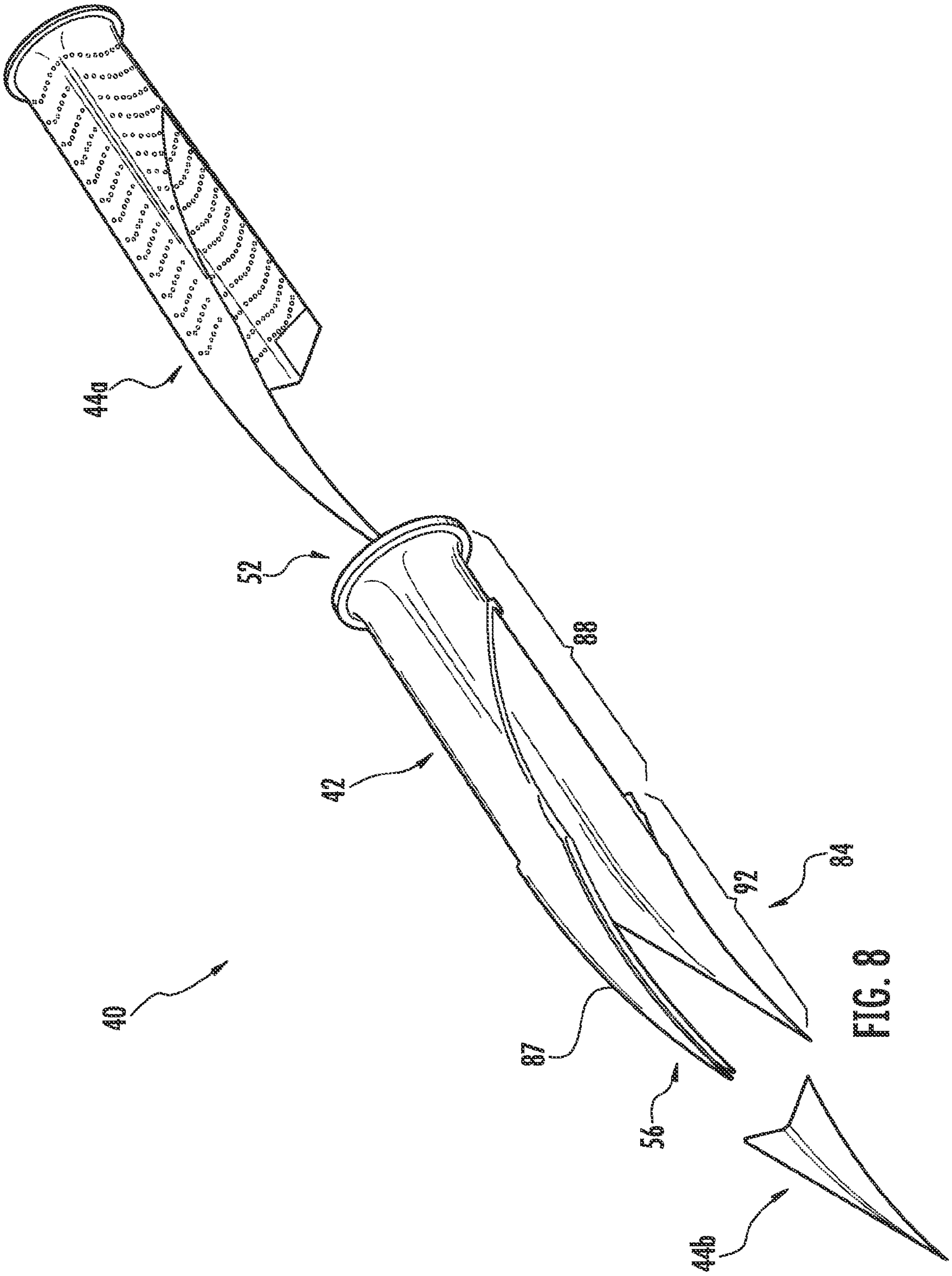
FIG. 8 is an exploded view of another embodiment of a transition duct assembly according to aspects of the invention, showing an inner liner formed by a plurality of liner segments.

Generally, the transition duct 42 can be a hollow body having an outer peripheral surface 46 and an inner peripheral surface 48. The transition duct 42 can have an inlet 50 including an inlet end 52 and an outlet 54 including an outlet end 56. In one embodiment, the inlet end 52 of the transition duct 42 can include a flange 58. The transition duct 42 can have an associated longitudinal axis 60. The longitudinal axis 60 can be substantially straight over substantially the entire length of the transition duct 42, as is shown in FIG. 2. Alternatively, at least a portion of the longitudinal axis 60 may not be straight, such as is shown in FIG. 8.

The transition duct 42 can have any suitable size, shape and/or configuration. The inner peripheral surface 48 of the transition duct 42 can be adapted so that it is convergent along a majority of its length. More particularly, the inner peripheral surface 48 of the transition duct 42 can be adapted so that it is convergent along substantially the entire length of the transition duct. "Convergent" means that the inner peripheral surface 48 of the transition duct 42 decreases in cross-sectional size along the length of the transition duct 42 going from the inlet end 52 to the outlet end 56. "Convergent" can include some regions in which the cross-sectional size of the transition duct 42 remains substantially constant, but at no point does the cross-sectional size increase along the length of the transition duct when going from the inlet end 52 to the outlet end 56.

The transition duct 42 can be made of any suitable material. For instance, the transition duct 42 can be made of a high temperature capable material. In one embodiment, the transition duct 42 can be made of a nickel-based alloy.

According to embodiments of the invention, the system 40 includes an inner liner 44 that is received in the transition duct 42. The inner liner 44 can have an outer peripheral surface 62 and an inner peripheral surface 64. The inner liner 44 can have an inlet 66 including an inlet end 68 and an outlet 70 including an outlet end 72. In some instances, the inner liner 44 can have a flange 74. The flange 74 can be provided at the inlet end 68 of the inner liner 44.

The inner liner 44 can have any suitable configuration depending on the transition duct 42. The inner liner 44 can be configured to generally conform to the inner peripheral surface 48 of the transition duct 42. The inner liner 44 can be correspondingly convergent to the inner peripheral surface 48 of the transition duct 42. The inner peripheral surface 64 of the inner liner 44 can define an internal flow passage 86 (see FIG. 4) of the transition duct assembly 40.

The outer peripheral surface 62 of the inner liner 44 may directly contact the inner peripheral surface 48 of the transition duct 42 along at least a portion of the length of the transition duct 42. In one embodiment, the inner liner 44 can be configured to substantially matingly engage the inner peripheral surface 48 of the transition duct 42.

In other cases, the inner liner 44 may be slightly spaced from the inner peripheral surface 48 of the transition duct 42. In such instances, the inner peripheral surface 44 of the transition duct 42 may include a series of protrusions 76 thereon. These protrusions 76 can be formed in any suitable manner. In one embodiment, the protrusions 76 can be cast into the inner peripheral surface 48 of the transition duct 42. Alternatively or in addition, the protrusions 76 can be provided on the outer peripheral surface 62 of the inner liner 44. The protrusions 76 can help to position the inner liner 44 within the transition duct 42. In some instances, the protrusions 76 may also provide heat transfer benefits.

Figure 6:
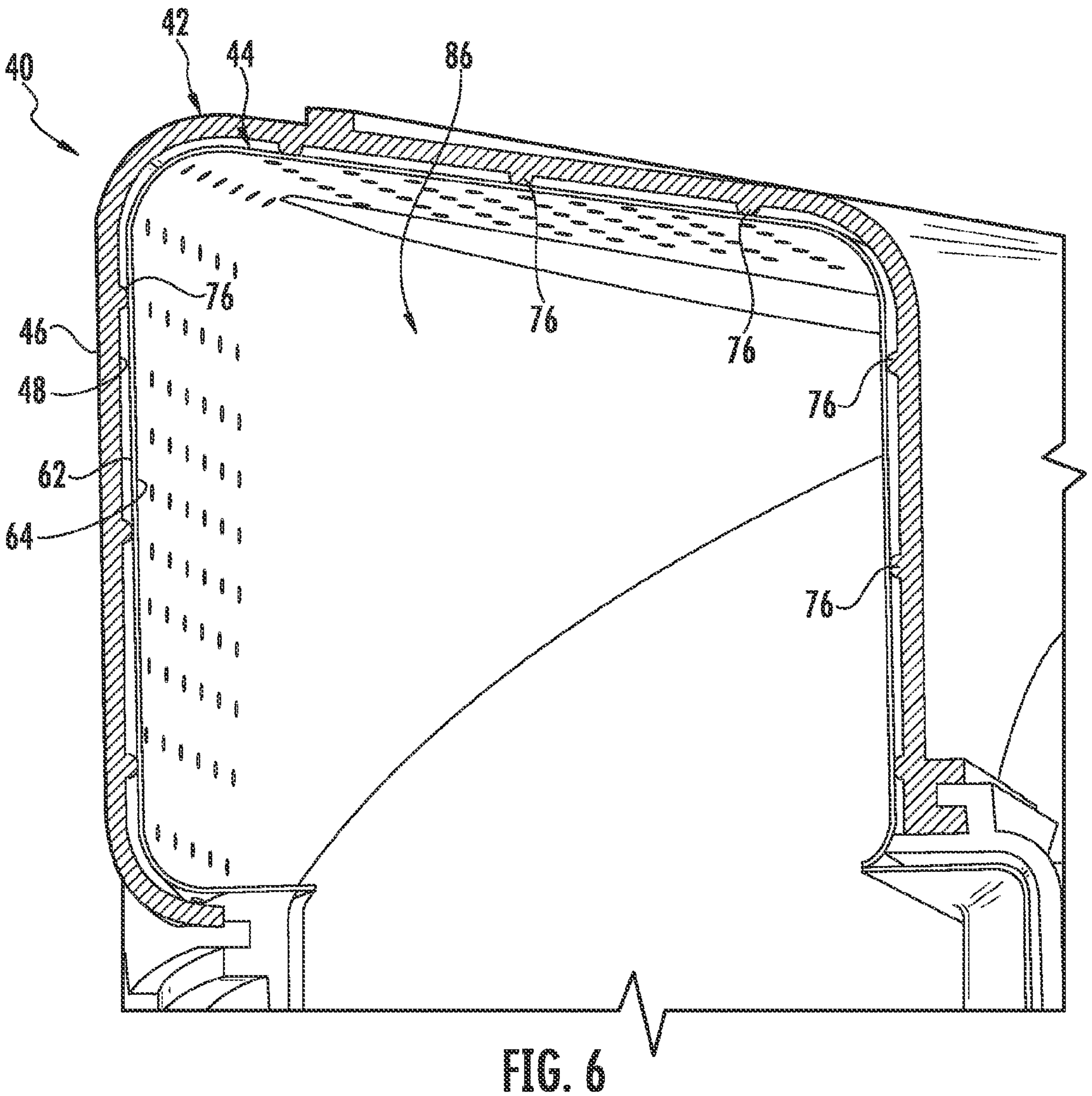
FIG. 6 is a side elevation cross-sectional view of a portion of a transition duct assembly according to aspects of the invention, showing the inner liner being spaced from an inner peripheral surface of the transition duct by a plurality of protrusions.

The protrusions 76 can have any suitable shape. For example, the protrusions 76 can be generally hemi-spherical, as is shown in FIG. 6. However, the protrusions 76 can be circular, oval, rectangular, triangular, or polygonal, just to name a few possibilities. The protrusions 76 can have any suitable size and/or shape. The protrusions 76 can be substantially identical to each other, or at least one of the protrusions 76 can be different from the other protrusions 76 in one or more respects. The protrusions 76 can be distributed on the liner 44 in any suitable manner.

In one embodiment, the inner liner 44 can be made of a single piece. Such a configuration may be appropriate when the longitudinal axis 60 of the transition duct 42 is substantially straight and convergent along its entire length, as is shown in FIG. 2. In such case, the inner liner 44 can be substantially correspondingly convergent. However, as will be described herein, there may be instances in which at least a portion of the longitudinal axis 60 of the transition duct 42 is not straight.

The inner liner 44 can be made of a different material than the transition duct 42. In one embodiment, the inner liner 44 can be made of any suitable material. In one embodiment, the liner 44 can be made of a thin sheet of material. In one embodiment, the inner liner 44 can be made of Inconel 617. At least a portion of the inner peripheral surface 64 of the inner liner 44 can be coated with a thermal insulating material. For instance, the thermal insulation material can be a thermal barrier coating 78.

The inner liner 44 can include a plurality of holes 80 therein. The holes 80 can be formed therein in any suitable manner, such as by laser drilling. The holes 80 can extend through the thickness of the inner liner 44 from the outer peripheral surface 64 to the inner peripheral surface 66. The holes 80 can have any suitable size and/or shape. For instance, the holes 80 can be circular, oval, rectangular, triangular, or polygonal. The holes 80 can be substantially identical to each other, or at least one of the holes 80 can be different from the other holes 80 in one or more respects. The holes 80 can be distributed on the inner liner 44 in any suitable manner.

Now that the individual components of a transition duct system 10 have been described, one manner of assembling the system 10 will now be explained. It will be understood that the following description is provided as only an example, and embodiments are not limited to any particular method of use.

Figure 3:
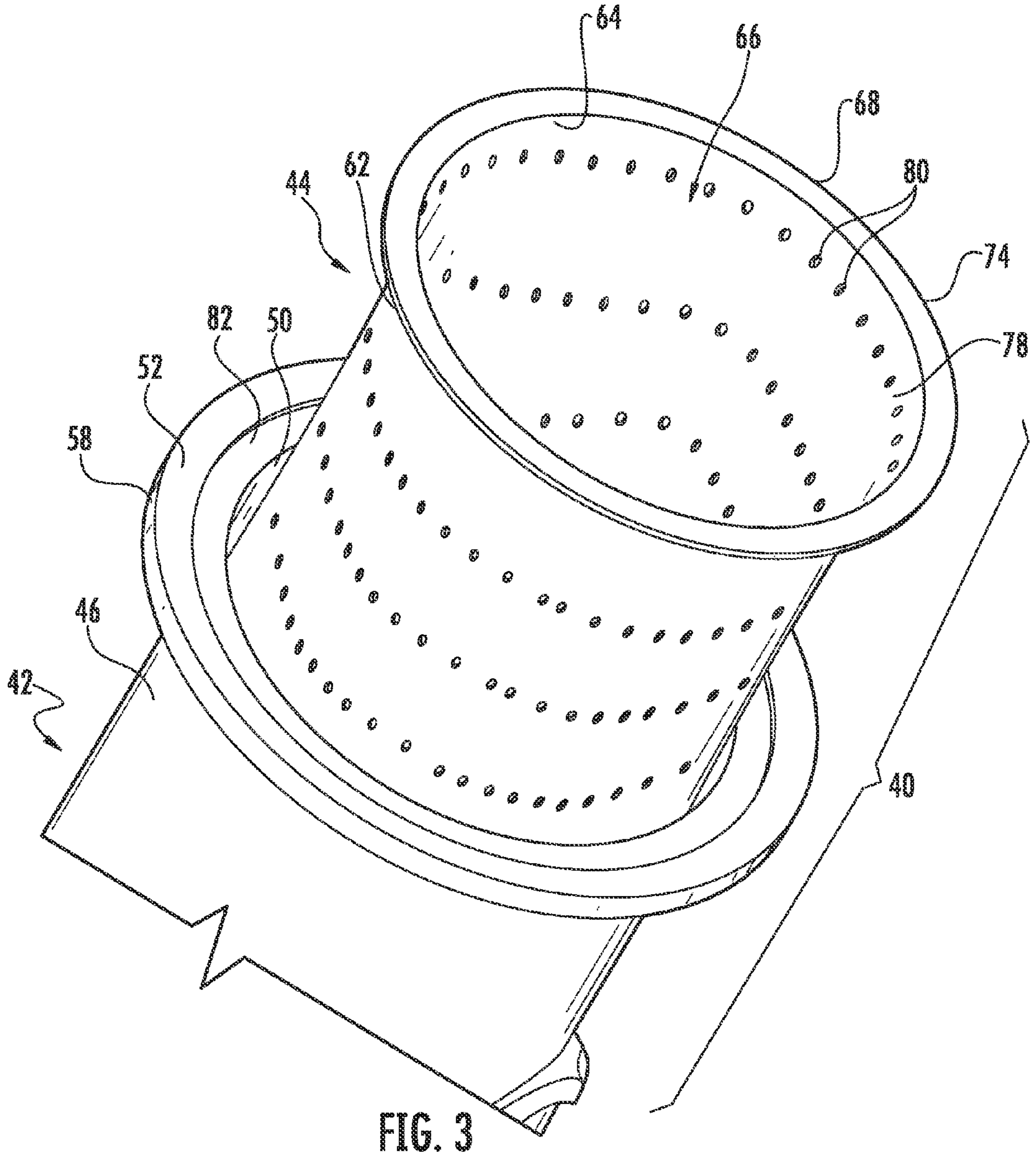
FIG. 3 is a close-up perspective view of a portion of a transition duct assembly according to aspects of the invention, showing an inner liner being received in an inlet of a transition duct.

The inner liner 44 and the transition duct 42 can be brought together such that the outlet end 72 of the inner liner 44 is received in the inlet 50 of the transition duct 42, as is shown in FIG. 3. The inner liner 44 and/or the transition duct 42 can be manipulated such that outlet end 72 of the inner liner 44 continues toward the outlet end 56 of the transition duct 42. Such relative movement can continue until the inner liner 44 cannot be moved any father downstream within the transition duct 42. Further movement of the inner liner 44 can be prevented due to engagement between the inner liner 44 and the transition duct 42, such as by engagement between the inner peripheral surface 48 of the transition duct 42 and the outer peripheral surface 62 of the inner liner 44. It will be appreciated that the convergent geometry of the transition duct 42 and the inner liner 44 can allow the liner 44 to be slid into the transition duct 42 without interference until it is fully engaged.

Figure 4:
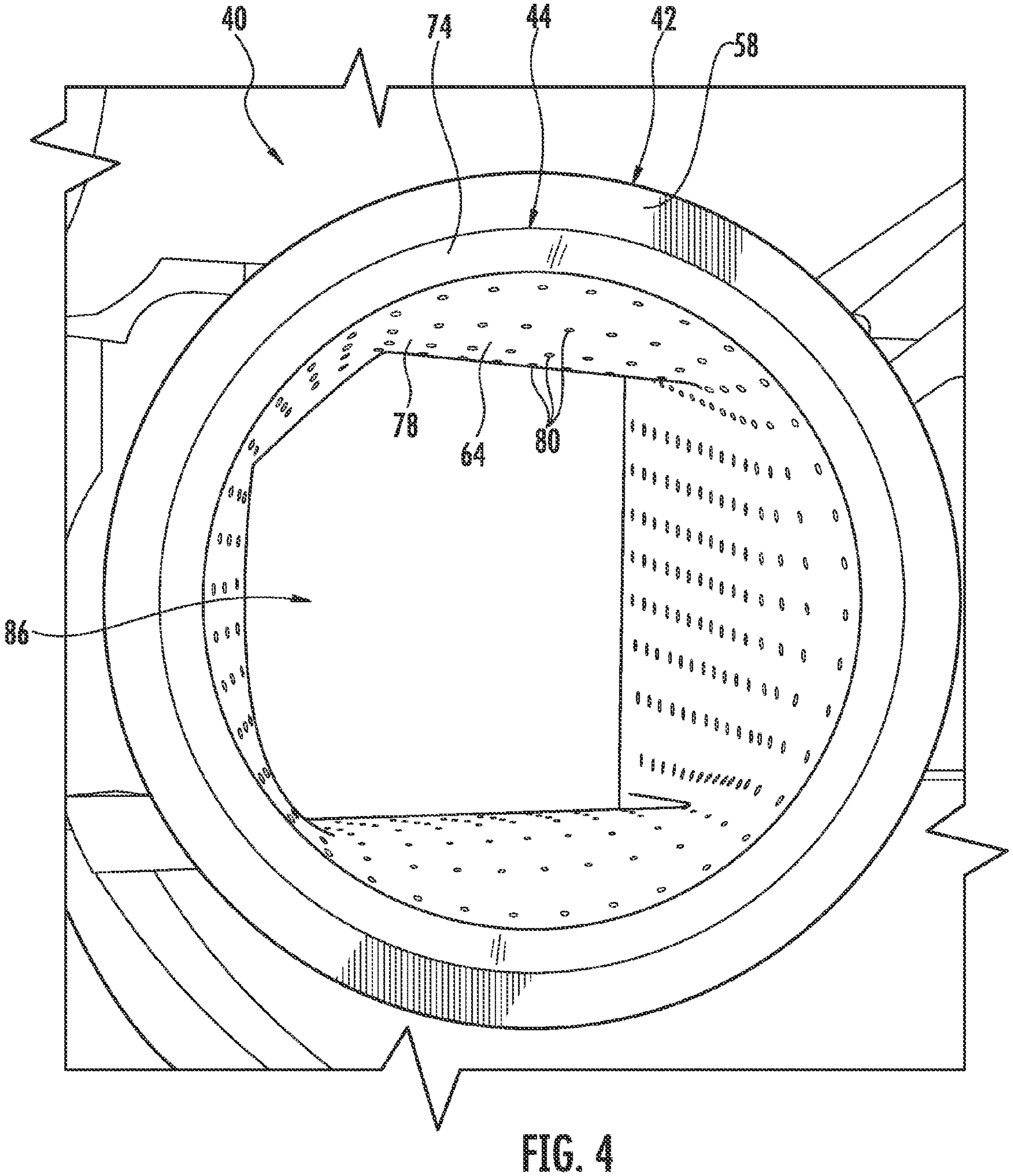
FIG. 4 is a side elevation view of an inlet end of a transition duct assembly according to aspects of the invention, showing an inlet flange of the inner liner engaging an inlet flange of the transition duct.
Figure 5:
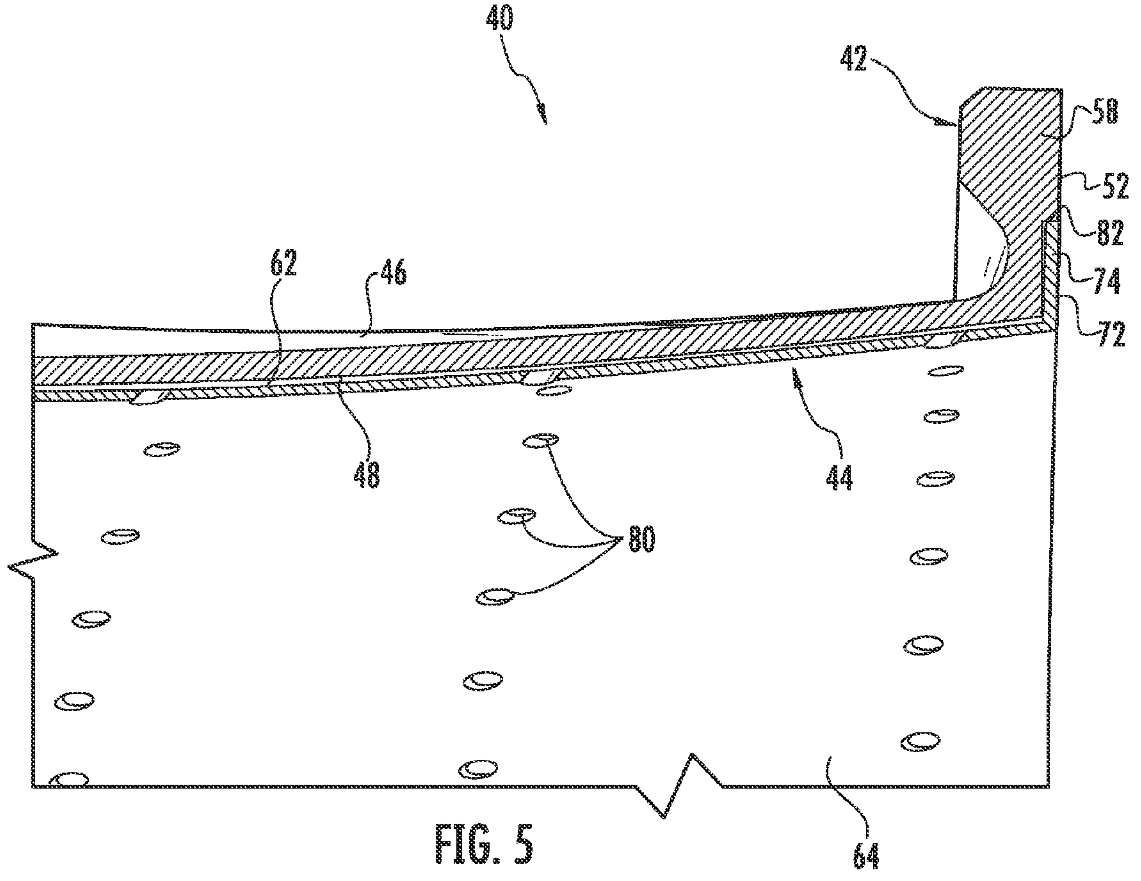
FIG. 5 is a close-up cross-sectional view of a portion of an upstream end portion of a transition duct assembly according to aspects of the invention, showing the inlet flange of the inner liner being received in a recess in the transition duct.

Alternatively or in addition, the flange 42 of the inner liner 44 can engage the inlet flange 58 of the transition duct 42, as is shown in FIG. 4. In one embodiment, the inlet flange 58 of the transition duct 42 can include an annular recess 82 to receive at least a portion of the flange 74 of the inner liner 44, as is shown in FIG. 5. As a result, the inlet end 68 of the inner liner 44 can be substantially flush with the inlet end 52 of the transition duct 42. The engagement between the flanges 58, 74 can assist in holding the liner 44 in place within the transition duct 42 and can prevent movement of the liner 44 in the longitudinally downstream direction.

The inner liner 44 can be held in place within the transition duct 42 in any suitable manner. For instance, the inner liner 44 can be held within the transition duct 42 by mechanical engagement therebetween, such as by engagement of the flanges 58, 74 and/or engagement between the inner peripheral surface 48 of the transition duct 42 and the outer peripheral surface 62 of the inner liner 44. Alternatively or in addition, other suitable means of holding the inner liner 44 within the transition duct 42 can be employed. Examples of other manners of engagement can be employed, including, for example, by fasteners, such as bolts, or adhesives. In one embodiment, one or more of such other manners of engagement may be employed to restrain the inner liner from backing out of the transition duct 42 in the longitudinally upstream direction and/or in the circumferential direction within the transition duct 42.

Figure 7:
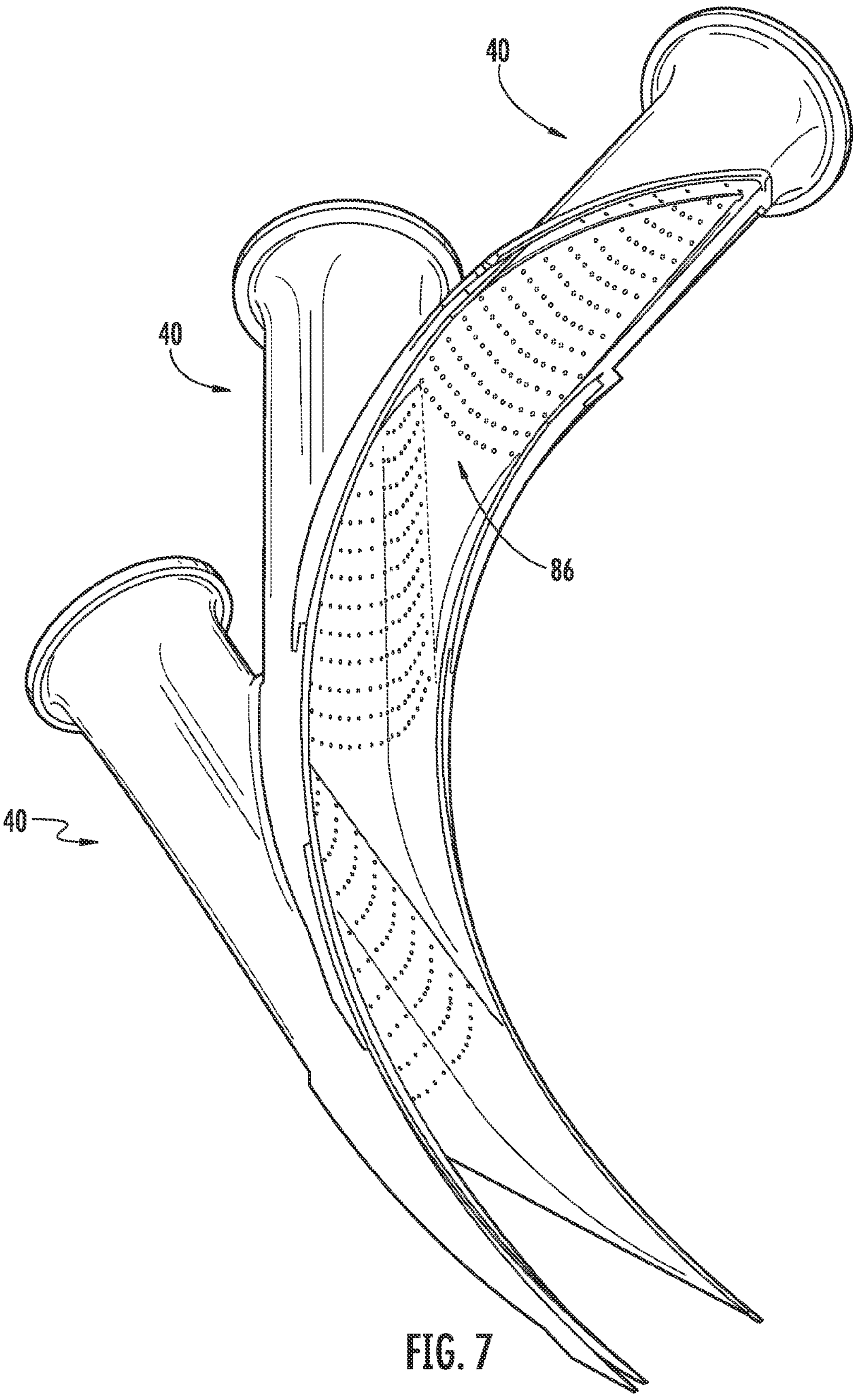
FIG. 7 is a perspective view of a portion of an arrangement of a plurality of transition duct assemblies according to aspects of the invention.

A plurality of transition duct assemblies 40, as described herein, can be arranged in a circumferentially array in the combustor section of a turbine engine. One example of such an arrangement of a plurality of transition ducts 42 with inner liners 44 in accordance with embodiments of the invention is shown in FIG. 7. As shown, the outlets 52, 70 of the transition duct assemblies 40 can merge. In cases where the transition duct assemblies 40 impart high tangential velocity on the hot working gases exiting the transition duct assemblies 40, the first row of stationary airfoils in the turbine section can be eliminated.

Figure 9:
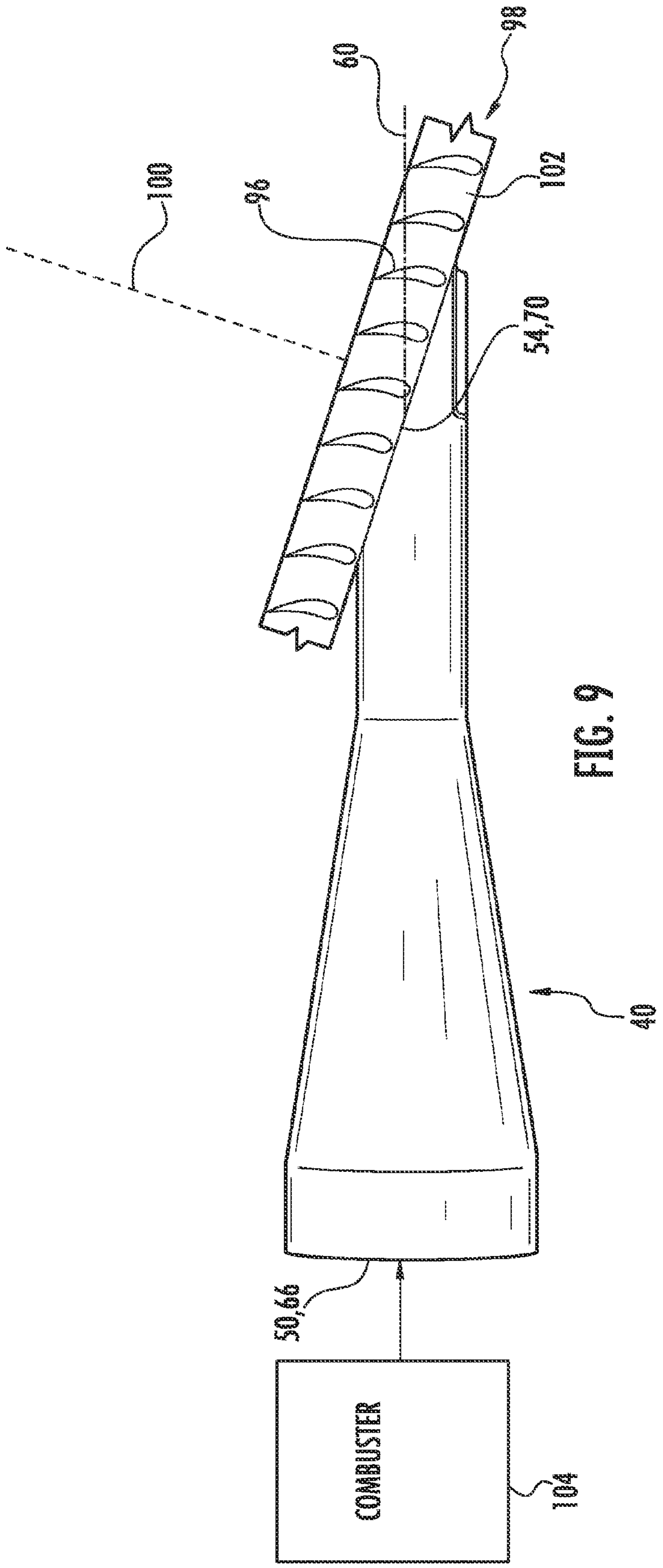
FIG. 9 is a side view of a portion of a combustor subassembly in which a transition duct assembly in accordance with aspects of the invention is implemented.

FIG. 9 shows an example combustion turbine subsystem 94 in which a plurality of transition ducts 42 with inner liners 44 in accordance with embodiments of the invention can be used. The subsystem 94 can include a first stage blade array 98 having a plurality of blades 96 extending in a radial direction (into and out of the page) from a rotor assembly 102 for rotation in a circumferential direction about an axis of rotation 100 of the rotor assembly 102. A plurality of combustors 104 (only one of which is shown) can be located upstream of the first stage blade array 98.

A plurality of transition duct assemblies 40, as described herein, can be operatively positioned between a respective combustor 104 and the first stage blade array 98 to receive the gas flow exhausted by the respective combustor 98 into the internal passage 86 through the inlet 66 in the inner liner 44. The outlet 70 of the inner liner 44 can discharge the gas flow from the internal passage 86 directly to the first stage blade array 98. The internal passage 98 of each duct assembly 40 can be free of vanes. The gas flow discharged from the outlet 54, 70 of each transition duct assembly 40 can flow directly to the first stage blade array 98 without passing any flow turning vanes.

It should be noted that, in some instances, a least a portion of the transition duct 42 may include a non-straight contour, particularly toward the outlet end 56 of the transition duct 42. For example, an outlet end region 84 of the transition duct 42 may include a non-straight contour, such as a curve 87, bend or angle, as is shown in FIG. 8. In such case, the transition duct 42 can have a straight portion 88 and a non-straight portion 90. As a result, it may be necessary to make the inner liner 44 from a plurality of segments, as it would not be physically possible to slide a one piece inner liner 44 into place within the transition duct 42 due to the presence of the non-straight portion 90.

FIG. 8 shows an embodiment in which the inner liner 44 is made of two pieces—an upstream liner segment **44*a* and a downstream liner segment 44*b*. The upstream liner segment 44*a* and the downstream liner segment 44*b* may or may not have substantially the same length. In one embodiment, the upstream liner segment 44*a* can be substantially longer than the downstream liner segment 44*b*. The upstream liner segment 44*a* can define the inlet 66 including the inlet end 68 of the liner 44. The upstream liner segment 44*b* can also define the flange 74**.

In one embodiment, the upstream liner segment **44*a* can be inserted into the inlet 50 of the transition duct 42. The downstream liner segment 44*b* can be inserted into the transition duct 42 through the outlet 54. The upstream liner segment 44*a* can be inserted into the transition duct 42 before or after the insertion of the downstream liner segment 44*b*. In one embodiment, the downstream liner segment 44*b* can be inserted into the transition duct 42 through the inlet 50 before the upstream liner segment 44*a***.

When the liner segments **44*a*, 44*b* are inserted into the inner liner 44, the upstream liner segment 44*a* may substantially abut the downstream liner segment 44*b*. "Substantially abut" means actual physical contact as well as slight spacing therebetween in at least some areas. The upstream liner segment 44*a* can be attached to the downstream liner segment 44*b* in any suitable manner. However, in some instances, the upstream liner segment 44*a* may not be attached to the downstream liner segment 44*b***.

During operation, hot working gases flow from the combustor into inlet 50, 66 of the transition system 40 according to aspects of the invention. The hot working gas can flow through the internal flow passage 86. The inner liner 44, which is closest to the flow of the hot working gases, is exposed to the highest temperatures and is susceptible to damage from the high temperature and combustion dynamics. It will be appreciated that a transition duct system 40 configured according to aspects of the invention allows the inner liner 44 to be made of a different material than the transition duct 42, one that is more suited to withstand exposure to the hot working gases and associated stresses imposed thereby.

The inner liner 44 can act as a thermal barrier to the transition duct 42. Since the transition duct 42 is not directly exposed to the hot gas path, it may experience fewer thermal-related problems, such as thermal displacements and creep. The transition duct 42 can be adapted to manage the expected mounting and/or sealing loads. Accordingly, an assembly 40 according to aspects of the invention allows there to be flexibility in the material selection for different portions of the assembly 40. For instance, different materials may be used for the transition duct 42 and the inner liner 44 based on the anticipated operational loads imposed thereon.

It will also be appreciated that the transition duct assembly 40 can allow the liner 44 to be readily removed and replaced. Thus, if the inner liner 44 is damaged, then the liner 44 can be easily removed from within the transition duct 42. The liner can be evaluated and, if possible, repaired. The repaired liner or a new liner can be readily replaced within the transition duct 42.

During engine operation, the holes 80 can allow for diffusion cooling of the liner 44. In instances in which the inner liner 44 is spaced from the inner peripheral surface 48 of the transition duct 42, air or other suitable coolant can be supplied to the space therebetween. For instance, metering holes or other inlets (not shown) can be provided in the transition duct 42 to allow fluid communication to the space between the inner peripheral surface 48 of the transition duct 42 and the exterior of the transition duct 42. The pressure of the coolant on the outside of the liner 44 can be greater than the pressure of the flow within the inner liner 44. As a result, some of the coolant can flow into the internal passage 86 of the assembly 40. Such coolant can provide beneficial cooling to the inner peripheral surface 64 of the inner liner 44.

The foregoing description is provided in the context of one possible configuration for the system according to aspects of the invention. The above description provides some examples, and it will be understood that the invention is not limited to the specific details described herein, which are given by way of example only, and that various modifications and alterations are possible within the scope of the invention as defined in the following claims.

What is claimed is:

1. A transition duct assembly for a turbine engine comprising:
- a transition duct having a hollow body with an inner peripheral surface and an outer peripheral surface, the transition duct having an inlet and an outlet, the transition duct having an inlet end and an outlet end, the inner peripheral surface of the transition duct being convergent along a majority of the transition duct when moving from the inlet end to the outlet end thereof;
- an inner liner removably received within the transition duct, the inner liner having a generally hollow body with an inner peripheral surface and an outer peripheral surface, the outer peripheral surface of the inner liner being correspondingly convergent to the inner peripheral surface of the transition duct, and the inner peripheral surface defining an internal flow passage through the assembly;
- and wherein the inner liner is made of a plurality of separate segments including an upstream liner segment and a downstream liner segment, wherein the upstream liner segment is inserted from the inlet end of the transition duct and wherein the downstream liner segment is inserted from the outlet end of the transition duct.

2. The transition duct system of claim 1 wherein the transition duct is made of a different material than the inner liner.

3. The transition duct system of claim 1 wherein the inlet end of the transition duct includes a flange, wherein the inlet end of the inner liner includes a flange, wherein the flange of the transition duct engages the flange of the inner liner.

4. The transition duct system of claim 3 wherein the inlet end of the transition duct includes a recess to receive at least a portion of the flange of the inner liner, whereby the inlet end of the transition duct is substantially flush with the inlet end of the inner liner.

5. The transition duct system of claim 1 wherein the liner includes a plurality of holes therein generally extending from the inner peripheral surface to the outer peripheral surface.

6. The transition duct system of claim 1 wherein at least a portion of the inner peripheral surface of the inner liner is coated with a thermal insulating material.

7. The transition duct system of claim 1 wherein the transition duct has an associated longitudinal axis, wherein the longitudinal axis is substantially straight along the entire length of the transition duct, and wherein the inner liner is a single piece.

8. The transition duct system of claim 1 wherein the transition duct has an outlet end region and a longitudinal axis, wherein the transition duct is curved in the outlet end region of the liner such that the longitudinal axis of the liner is not substantially straight in the outlet end region.

9. The transition duct system of claim 1 wherein the upstream liner segment abuts the downstream liner segment.

10. The transition duct system of claim 1 wherein the upstream liner segment is attached to the downstream liner segment.

11. The transition duct system of claim 1 wherein the inner liner substantially matingly engages the inner peripheral surface of the transition duct.

12. The transition duct system of claim 1 wherein a plurality of protrusions extend from the inner peripheral surface of the transition duct, whereby the protrusions maintain the outer peripheral surface of the inner liner in spaced relation to the inner peripheral surface of the transition duct.

13. A combustion turbine subsystem, comprising:
- a first stage blade array having a plurality of blades extending in a radial direction from a rotor assembly for rotation in a circumferential direction about an axis of the rotor assembly;
- a plurality of combustors located upstream of the first stage blade array;
- a plurality of transition duct assemblies, each of the transition duct assemblies comprising:
- a transition duct having a hollow body with an inner peripheral surface and an outer peripheral surface, the transition duct having an inlet and an outlet, the transition duct having an inlet end and an outlet end, the inner peripheral surface of the transition duct being convergent along a majority of the transition duct when moving from the inlet end to the outlet end thereof;
- an inner liner removably received within the transition duct, the inner liner having a generally hollow body with an inner peripheral surface and an outer peripheral surface, the outer peripheral surface of the inner liner being correspondingly convergent to the inner peripheral surface of the transition duct, and the inner peripheral surface defining a flow passage through the assembly, the inner liner being made of a different material than the transition duct, each transition duct body being located between a respective combustor and the first stage blade array to receive the gas flow exhausted by the respective combustor into the internal passage through the inlet in the inner liner, the outlet of the inner liner discharging the gas flow from the internal passage directly to the first stage blade array, the internal passage of each duct being free of vanes, whereby the gas flow discharged from the outlet of each transition duct body flows to the first stage blade array without passing any flow turning vanes; and wherein the inner liner is made of a plurality of separate segments including an upstream liner segment and a downstream liner segment; wherein the upstream liner segment is inserted from the inlet end of the transition duct and wherein the downstream liner segment is inserted from the outlet end of the transition duct.

14. The combustion turbine subsystem of claim 13 wherein the inlet end of the transition duct includes a flange and a recess, wherein the inlet end of the inner liner includes a flange, wherein the flange of the inner liner being received in the recess such that inlet end of the transition duct is substantially flush with the inlet end of the inner liner.

15. The combustion turbine subsystem of claim 13 wherein each transition duct has an associated longitudinal axis, wherein the longitudinal axis is substantially straight along the entire length of the transition duct, and wherein the inner liner is a single piece.

16. The combustion turbine subsystem of claim 13 wherein the transition duct has an outlet end region and a longitudinal axis, wherein the longitudinal axis is substantially straight along a substantial portion of length of the transition duct, the transition duct is non-linear in the outlet end region of the liner such that the longitudinal axis of the liner is not substantially straight in the outlet end region.

17. The combustion turbine subsystem of claim 13 wherein, for at least one of the plurality of transition duct assemblies, the upstream liner segment abuts the downstream liner segment.

18. The combustion turbine subsystem of claim 13 wherein for at least one of the plurality of transition duct assemblies, the upstream liner segment is attached to the downstream liner segment.

* * * * *